United States Patent [19]

Park et al.

[11] Patent Number: 5,532,695
[45] Date of Patent: Jul. 2, 1996

[54] POWER OF TWO LENGTH PSEUDORANDOM NOISE SEQUENCE GENERATOR

[75] Inventors: Gyeong-Lyong Park; Chung-Wook Suh; Ik-Soo Eo, all of Daejeon, Rep. of Korea

[73] Assignees: Electronics and Telecommunications Research Institute, Daejeon-shi; Korea Telecommunication Authority, Seoul, both of Rep. of Korea

[21] Appl. No.: 360,136

[22] Filed: Dec. 20, 1994

[30] Foreign Application Priority Data

Apr. 13, 1994 [KR] Rep. of Korea ................ 94-7767

[51] Int. Cl.$^6$ .................................. G08C 19/12
[52] U.S. Cl. .................. 341/173; 341/187; 375/200; 364/717
[58] Field of Search .................. 341/173, 174, 341/184, 185, 187; 370/18, 19, 21, 22; 379/59; 455/33.1, 33.2; 375/200; 331/78; 364/717

[56] References Cited

U.S. PATENT DOCUMENTS

| | | | |
|---|---|---|---|
| 4,493,046 | 1/1985 | Watanabe | 364/717 |
| 5,046,036 | 9/1991 | Tezuka | 364/717 |
| 5,228,054 | 7/1993 | Rueth et al. | 375/200 |

*Primary Examiner*—Glen Swann
*Assistant Examiner*—Andrew Hill
*Attorney, Agent, or Firm*—Larson and Taylor

[57] ABSTRACT

A mobile communication method is disclosed, and particularly a power of two length pseudorandom noise sequence generator is disclosed, in which a pseudorandom noise code sequence is generated to use it for a direct sequence spreading of communication signals in a spread spectrum communication system. In the PN sequence generator, a mask value and a comparison value are calculated for shifting the PN sequence output having a length of $2^N$ as much as wanted, so that the PN sequence can be shifted as much as a predetermined value in response to the single clock signal. In order to generate a PN sequence of the desired timing, a new PN mask value is directly obtained from the current PN mask value and the offset shift value to be shifted, and at the same time, a comparison value corresponding to the mask value is obtained, whereby ultimately a PN sequence having a length of $2^N$ after shifting the cycle as much as the desired shifting value is obtained. The present invention adopts a method of forming a new comparison value corresponding to the PN mask value by using a comparison value translator, and as a result, the conventional additional circuits for inserting an additional bit into the PN sequence output are not required, and therefore, the constitution of the present invention is very much simplified compared with the conventional apparatus.

1 Claim, 11 Drawing Sheets

POWER OF TWO LENGTH PSEUDORANDOM NOISE SEQUENCE GENERATOR

FIELD OF THE INVENTION

The present invention relates to a mobile communication, and particularly to a power of two length pseudorandom noise (PN) sequence generator, in which a pseudorandom noise code sequence is generated to use it for a direct sequence spreading of communication signals in a spread spectrum communication system.

BACKGROUND OF THE INVENTION

In a spread band mobile communication system of a code division multiple access type (To be called "CDMA" below), one of the major functions of a mobile station is to form synchronization between spreading communication signals and the spread band signals, so that the signals can be decoded to the original form before the spreading.

In the CDMA mobile communication system, pilot pseudo random sequence signals having a length of $2^{15}$ (32,768) chips are used, so that the mobile station can achieve a synchronization with spread band signals sent from a base station.

That is, the pilot pseudorandom sequence signals are used as spreading signals for spreading the band width of the digital signals.

The pseudorandom sequence signals are provided not only as a phase reference for matching the synchronization, but they are used as a means for comparing the signal intensities between base stations.

In order to discriminate the forward CDMA channels which use the same codes, the base stations use a time offset of the pilot pseudorandom sequence.

That is, the base station have mutually different offset values.

Therefore, in the CDMA mobile communication system, if a mobile station is to achieve a synchronization with the signals of base stations, and during a passing through a boundary of cells, if a mobile station is to be quickly adapted to the signals of a base station having a different offset value so as to receive the signals, first of all, there is required a pseudorandom noise be called "PN" below) generator in which the mobile station can easily move the PN.

In other words, generally in the direct sequence spreading band communication, the PN sequence generator is used to match the received and transmitted signals. During the receiving and transmitting of signals in the CDMA mobile communication system, signals are encoded or decoded into spread spectrum by utilizing the PN sequence. That is, PN sequences having different offset values are assigned to the respective base stations, so that the PN sequences of the respective base stations can be distinguished. Therefore, the respective base stations can re-use the frequencies, and therefore, many subscribers can be accommodated within the permitted frequency band.

In the direct sequence spreading band communication system such as CDMA, the PN sequence is formed by a linear sequence shifter register (to be called LSSR).

The LSSR, i.e., the PN sequence generator includes: an N-stage shift register; and a plurality of exclusive OR gate added to the shifter register for programming the PN sequence.

The locations of the exclusive OR gates are determined by a defining polynomial of circuit which determines which sequence among the possible sequences has occurred.

For the N-stage generator, a total of $2^{(N-1)}-1$ polynomials exist. Among them, only a part (about 10%) generates the maximum length.

For example, a PN sequence generator which has 15 stages and the maximum polynomials generates a sequence of 32,762 bits or chips.

The pilot PN sequence which is normally used in the CDMA spread band mobile system is formed from the following polynomials in accordance with the phase.

<In-phase>

$$P_I(X)=1+X^5+X^7+X^8+X^9+X^{13}+X^{15} \qquad (1)$$

<Quadrupture-phase>

$$P_Q(X)=1+X^3+X^4+X^5+X^6+X^{10}+X^{11}+X^{12}+X^{15} \qquad (2)$$

Of the above polynomials, the PN sequence generator which corresponds to Formula 1 consists of 15 stages as shown in FIG. 3.

The length of the PN sequence which is generated by the 15-stage LSSR is $2^{15}$ (32,767) chips or bits.

In actually constituting the PN sequence generator, generally the length of a $2^N-1$ sequence, i.e., most of the numbers (1, 3, 5, 7, 15, 31, ..., 255, 511, ..., 32767, ... $2^N-1$) are prime numbers having no factors. Therefore, their applications are not suitable.

This makes it difficult to synchronize the systems which are operated with a low rate compared with the PN chip rate.

In an actual example, for a data modulation rate of 9600 bits per second, a PN sequence rate of 1.2288 MHz is required.

The information bits are subjected to an exclusive Or with the PN sequences, and the result is subjected to a 2-phase modulation with an RF carrier for transmissions.

Thus a PN of 128 chips per information bit is provided.

In other operating modes, the PN rate is same, but the data rate is reduced to 4800 per second (256 chips per information bit).

That is, when a PN sequence which has a length of $2^{N-1}$ is to be applied to the actual spreading band system, particularly when various data rates are used, it is difficult to synchronize the signals.

It is desirable that the data modulations for the repetition of the PN sequences are synchronized. However, if the PN sequence has a length of 32767 (i.e., $2^{15}-1$) having 7, 3, and 151 as the minor factor, then the repetition gap of the PN code and the above described two data rates correspond with each other only in every 128 or 256 repetition gap.

Such correspondence is formed every 3.4 seconds, or every 6.8 seconds, and no correspondence is seen in other gaps.

In view of this, it is desirable that the length of PN sequence is $2^N$ in which the correspondence frequency is increased in the repetition gaps of the PN sequence for the multiple data rates.

For this purpose Qualcomm company of the United States describes in its U.S. Pat. No. 5,228,054 a PN sequence generator which generates a PN sequence having a length of $2^N$ for using it in the CDMA spread band mobile communication system. The constitution of this PN generator is illustrated in detail in FIG. 14.

Referring to FIG. 14, this conventional PN sequence generator roughly includes: an LSSR 10 for generating a PN sequence having a length of $2^N-1$; a circuit lengthening circuit composed of an N-bit comparator 20, two D flip-flops 21 and 22, an invertor 24, a NAND gate 26, and an AND gate 28, for inserting an additional bit to a proper bit position within the PN sequence output of the LSSR 10; and a random sequence moving circuit composed of a mask circuit 30, D flip flops 40 and 58, a multiplexer 42, a binary counter 48, a comparator 52, and logic gates 44, 46, 50, 54 and 56.

In this technique, 14 zeros '0' continuously occurs within the PN sequence (this occurs only once per sequence cycle), and then, one '0' is added to form a PN sequence having a length of $2^{15}$ (=32,768), so that it can be applied to the system.

In this case, if various data such as 1200, 2400, 4800, 9600 bps and the like are applied, synchronization are easily formed between the data and the spreading signals.

However, in this conventional apparatus, the input of the comparator 20 which is for inserting an additional bit into the PN sequence output is fixed to '0 . . . 0100'. Therefore, a binary counter 42, an offset comparator 52 and other logic gates are required, with the result that the constitution of the circuit is complicated.

Further, there should be prepared in advance a PN mask lookup table which occupies a large amount of memory, and therefore, the efficiency of the system operation is lowered.

SUMMARY OF THE INVENTION

The present invention is intended to overcome the above described disadvantages of the conventional technique.

Therefore it is an object of the present invention to provide a PN sequence generator in which a PN sequence having a length of $2^N$ (the maximum length linear sequence) can be generated.

It is another object of the present invention to provide a PN sequence generator in which the PN generator for generating a PN sequence having a length of $2^N$ has a simple hardware.

It is still another object of the present invention to provide a PN sequence generator in which a mask value and a comparison value are calculated for shifting the PN sequence output having a length of $2^N$ as much as wanted, so that the PN sequence can be shifted as much as a predetermined value in response to the single clock signal.

In achieving the above objects, the present invention is characterized in that, in order to generate a PN sequence of the desired timing, a new PN mask value is directly obtained from the current PN mask value and the offset shift value to be shifted, and at the same time, a comparison value corresponding to the mask value is calculated, whereby ultimately a PN sequence having a length of $2^N$ after shifting the cycle as much as the desired shifting value is obtained.

In another aspect of the present invention, the PN generator according to the present invention includes: a PN sequence generating means for generating a PN sequence having a length of $2^N-1$; a PN mask translating means for translating mask values correspondingly with an offset shift value inputted for shifting the PN sequence output as much as the offset shift value; a mask means for masking the translated mask value and for masking the PN sequence output; a comparison value translating means for translating the comparison value to insert an additional bit into the desired position within the PN sequence output; and a comparing means for comparing the translated comparison value and the output of the PN sequence generating means to output signals which indicate as to whether the two inputs are same each other.

The PN mask translating means and the comparison value translating means are capable of generating PN mask values for shifting the PN sequence output by 1 chip through supplying of one clock signal. At the same time, they are capable of translating the comparison value to a new value corresponding to the PN mask value, and therefore, it becomes possible to insert '0' into the desired position within the PN sequence output.

According to the present invention, it is possible to shift the PN sequence by once as much as a large offset value.

BRIEF DESCRIPTION OF THE DRAWINGS

The above objects and other advantages of the present invention will become more apparent by describing in detail the preferred embodiment of the present invention with reference to the attached drawings in which.

DESCRIPTION OF THE PREFERRED EMBODIMENT

The constitution and operation of the PN sequence generator according to the present invention will be described based on the preferred embodiment of the present invention.

If the mask value is shifted in the PN sequence generator, then a PN sequence in which a shifting relative to the output of the linear sequence shifter register (LSSR) has been made as much as an arbitrary value can be obtained as the output of a mask circuit, this being, a known fact.

When a PN sequence is to be shifted as much as the offset amount, if only the PN mask value can easily be calculated, then the shifted PN sequence output can be obtained only through the translation of the PN mask value without any other operation.

Figure 1:
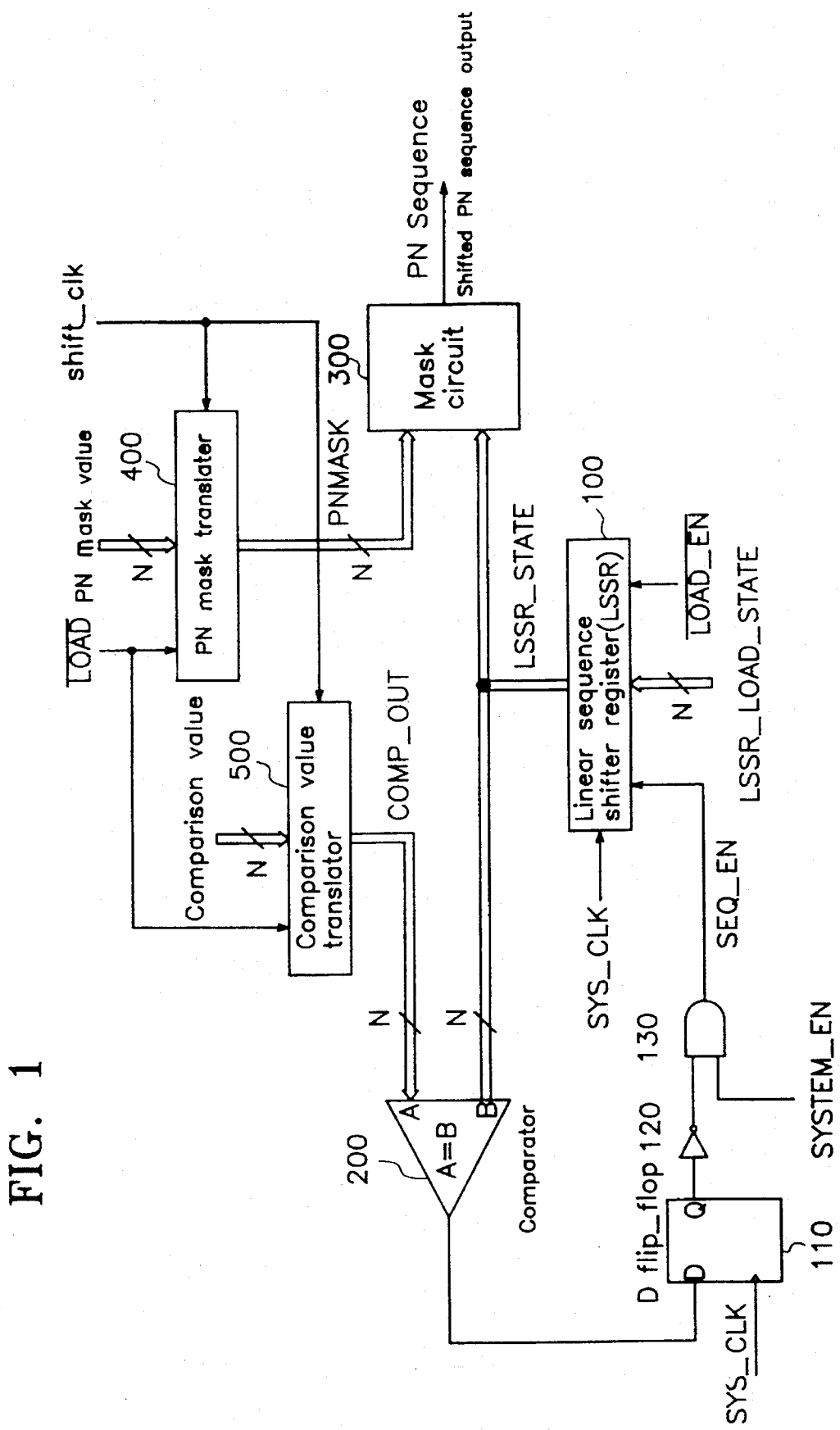
FIG. 1 is a schematic view showing the constitution of the pseudorandom sequence generator for generating a pseudorandom sequence having a length of $2^N$ according to the present invention.

Based on this principle, the PN sequence generator according to the present invention has the constitution as shown in FIG. 1.

Referring to FIG. 1, the PN sequence generator according to the present invention includes: a linear sequence shifter register (LSSR) 100 for being operated in synchronization with system clock signals SYS-CLK, for receiving an initial LSSR state input (LSSR load state) in accordance with load enable signals $\overline{\text{LOAD-EN}}$, and for carrying out a shift operation in accordance with sequence enable signals, so as to generate a PN sequence; a comparator 200 for receiving the output LSSR-STATE of the LSSR 100 into an input terminal and for receiving the comparison value COMP-OUT into another input terminal, to compare the two inputs and to output a result output based on the comparison; a D flip flop 110 for receiving the output of the comparator 200 in synchronization with the system clock signals SYS-CLK -to output them; an invertor 120 with its input connected to the output Q of the flip flop 110; an AND gate 130 for receiving the output of the invertor 120 into one of its input terminals, and for receiving the system enable signals SYSTEM-EN into another input terminals, to carry out a logic arithmetic (ANDing) and to furnish sequence enable signals SEQ-EN to the PN LSSR 100; a mask circuit 300 for receiving the output of the PN LSSR 100 (LSSR-STATE) and a PN mask data PNMASK to carry out a masking and to output it; a PN mask translator 400 for being operated in synchronization with the shift clock signals (SHIFT-CLK), and for receiving the initial PN mask value in accordance with the load signals $\overline{\text{LOAD}}$ to translate them into PN mask data PNMASK before outputting them; and a comparison value translator 500 for being operated in synchronization with the shift clock signals (SHIFT-CLK), and for receiving an initial comparison value of N bits in accordance with the load signals $\overline{\text{LOAD}}$ to translate it into a value (COMP-OUT) corresponding to the PN mask data PNMASK to supply them to the comparator 200.

When the value LSSR-STATE is same as the translated comparison value COMP-OUT, the D flip-flop 110, the invertor 120 and the AND gate 130 are used as means for adding one bit '0' into a predetermined bit location by delaying the LSSR-STATE value by one cycle.

Figure 2:
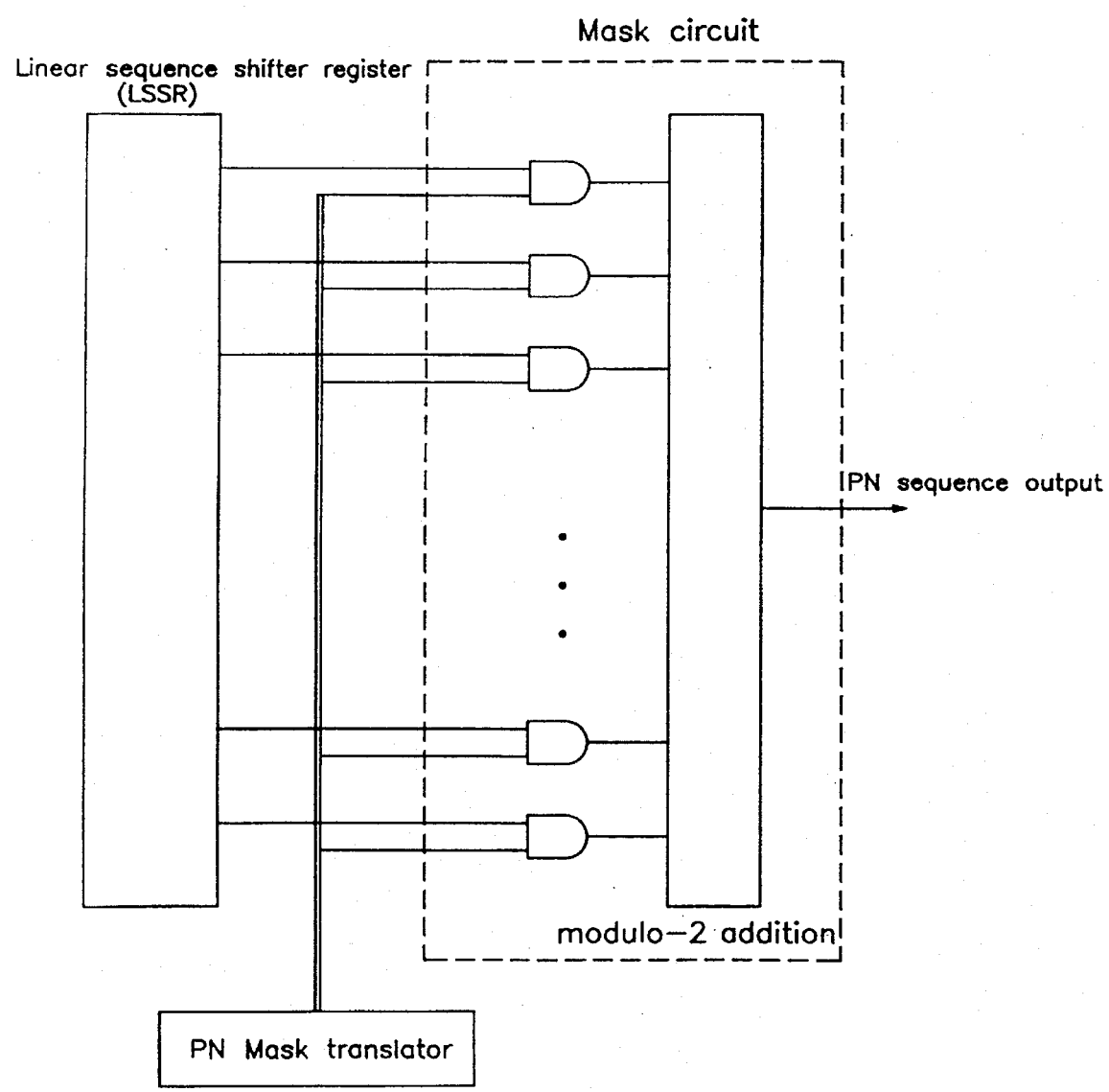
FIG. 2 is an exemplary illustration of showing the constitution of the pseudorandom sequence generator in which the PN sequence can be shifted as much as desired by changing the PN mask value.

In the present invention, the PN sequence generator of FIG. 2 is proposed, and a new PN mask value is formed from the current random mask value, so that the PN sequence output can be shifted as much as the desired offset shift value.

Figure 4:
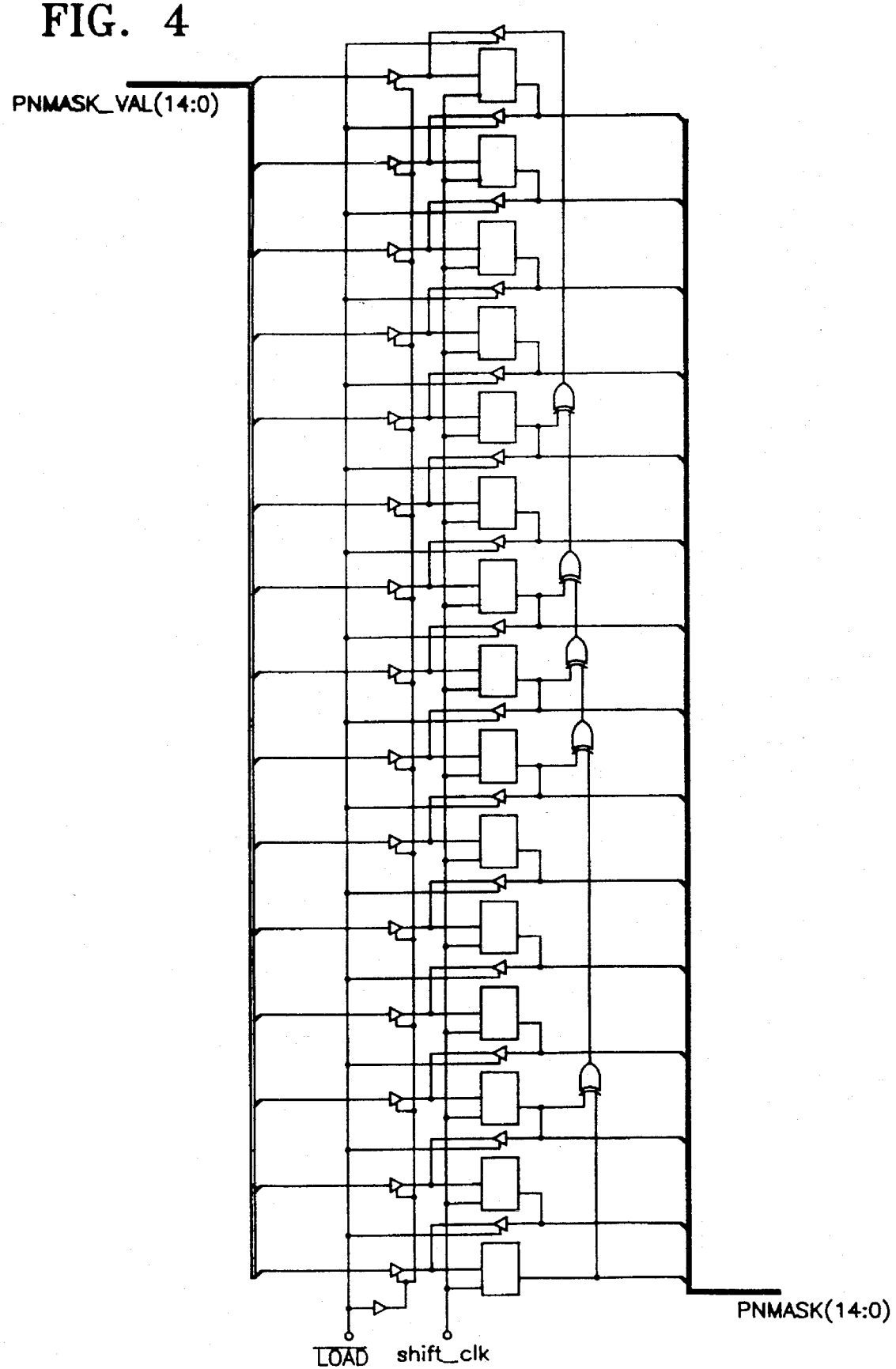
FIG. 4 is an exemplary circuital illustration showing the constitution of the PN sequence generator of FIG. 1 which corresponds to the PN sequence generator of FIG. 3.

FIG. 4 illustrates a circuit of an embodiment of the PN mask translator in which, when the PN sequence formation polynomial is same as Formula 1, a PN mask value is formed for shifting the PN sequence.

This circuit has a feature such that the PN mask value is translated by one shift clock signal SHIFT-CLK, so that the PN sequence can be shifted by one chip.

If the shifting direction can be reversed by using a bidirectional shift register, then the shifting direction of the PN sequence can be set in the opposite way.

The relationship between the new PN mask value and the PN mask value before the translation can be expressed as follows.

$$m_i = M \, m_{i-1} \tag{3}$$

In the above formula, M indicates N×N mask translation matrix, $m_{i-1}$ indicates a PN mask vector value before the translation, and $m_i$ indicates a newly obtained mask vector value.

FIG. 4 illustrates a circuit in which, when the circuit is operated under a shift mode, the PN mask translating operation is carried out by using a mask translating matrix M as shown in Formula 4 below. The translating operation of the mask value based on Formula 3 corresponds to the shifting operation of FIG. 8.

Figure 8:
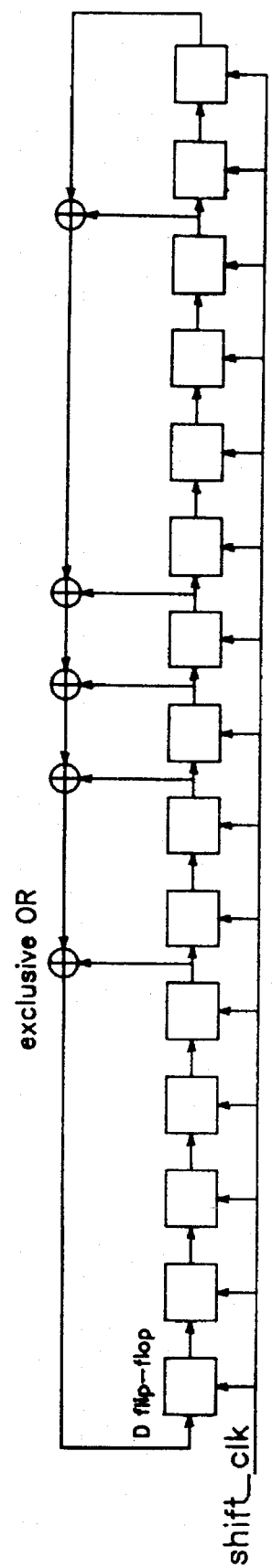
FIG. 8 illustrates the operation of translating a PN sequence mask value for shifting by one chip the output of the PN sequence generator in which the generation polynomial is $P(X)=1+X^5+X^7+X^8+X^9+X^{13}+X^{15}$.

The translation circuit 400 of FIG. 4 which uses the PN mask translating matrix of Formula 4 carries out the operation of FIG. 8, thereby making it possible to obtain a translated PN mask data PNMASK.

That is, if the mask translating circuit 400 is shifted N times, then a PN mask value which is for shifting the PN sequence output as much as the N offset value is obtained.

If the offset value is large, a new PN mask value can be obtained by utilizing a PN mask value calculating method of the present invention to be described below. Therefore, there can be obtained a PN sequence which is shifted as much as the offset shift value within a short period of time.

$$M = \begin{pmatrix} 0 & 0 & 0 & 0 & 1 & 0 & 1 & 1 & 1 & 0 & 0 & 0 & 1 & 0 & 1 \\ 1 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 1 & 0 \end{pmatrix} \tag{4}$$

In the PN sequence generator of FIG. 1 according to the present invention, after the binary number '0' is outputted for 14 times continuously, in order to insert a binary '0', the comparison value COMP-OUT is compared with the LSSR-STATE. When the value of LSSR-STATE is same as the comparison value, the LSSR-STATE value delayed by one cycle so as to add one bit '0'.

Under this condition, it is a matter of fact that the comparison value has to be varied in accordance with the PN mask value.

If the comparison value is fixed, then the bit which is to be added during the change of the mask value for shifting the PN sequence cannot be inserted into the desired position within the PN sequence output (when '0' is outputted continuously for 14 times).

In the PN sequence generator of the prior art described above, the comparison value is fixed, and therefore, in order to insert the binary number '0' into the desired position within the PN sequence output, there are required various devices such as the binary counter, the binary offset comparator, the delay circuit and the multiplexer.

Further, in the conventional PN sequence generator, if the PN sequence is to be effectively shifted, there is required a logic circuit for adjusting the timing of the signals LOAD-EN which loads the initial value of the LSSR-STATE.

Figure 9:
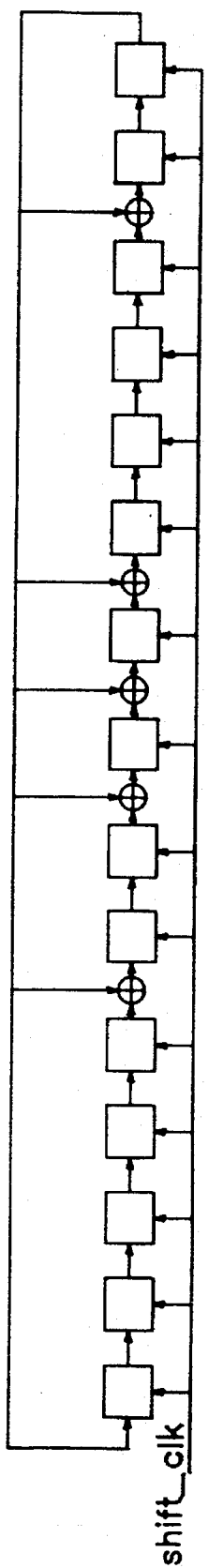
FIG. 9 illustrates the comparison value translating operation corresponding to the mask value translating operation of FIG. 8.

In the present invention, when the PN mask value is translated by carrying out the operation of FIG. 8, the corresponding comparison value is translated by using the circuit of FIG. 9. Therefore, it becomes possible to insert one desired bit into the desired position of the shifted PN sequence.

If only the PN mask value is known, the PN sequence output can be arbitrarily shifted without taking into account the LSSR-STATE. Therefore, there is required no circuit for adjusting the timing of the signals LOAD-EN. That is, at an arbitrary time when the system is initiated, the initial value of the LSSR-STATE has only to be loaded only once.

Figure 3:
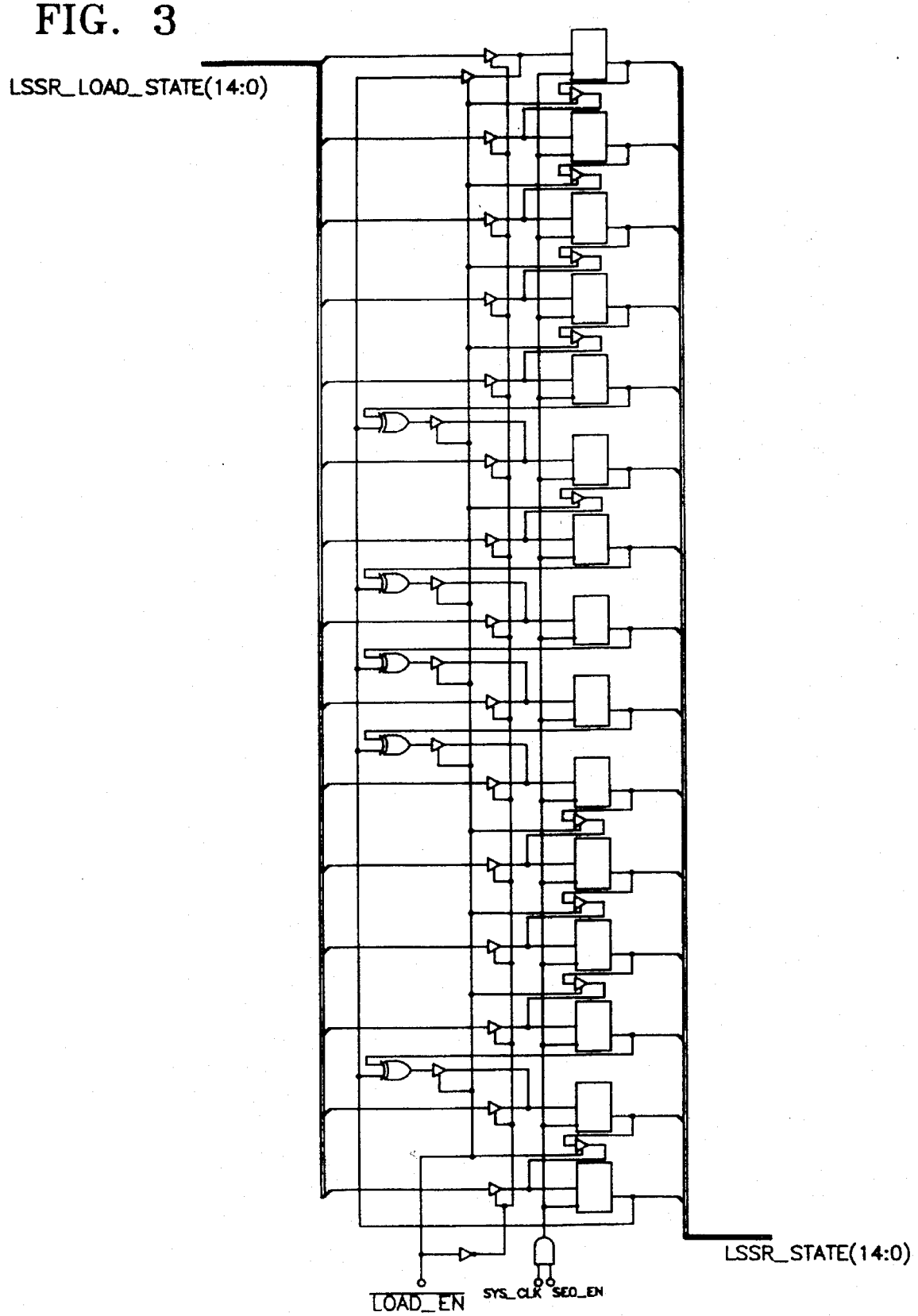
FIG. 3 is an exemplary circuital illustration showing the constitution of the PN sequence generator of FIG. 1 which generates a PN sequence having a length of $2^{15}-1$, the generation polynomial being $P(X)=1+X^5+X^7+X^8+X^9+X^{13}+X^{15}$.
Figure 5:
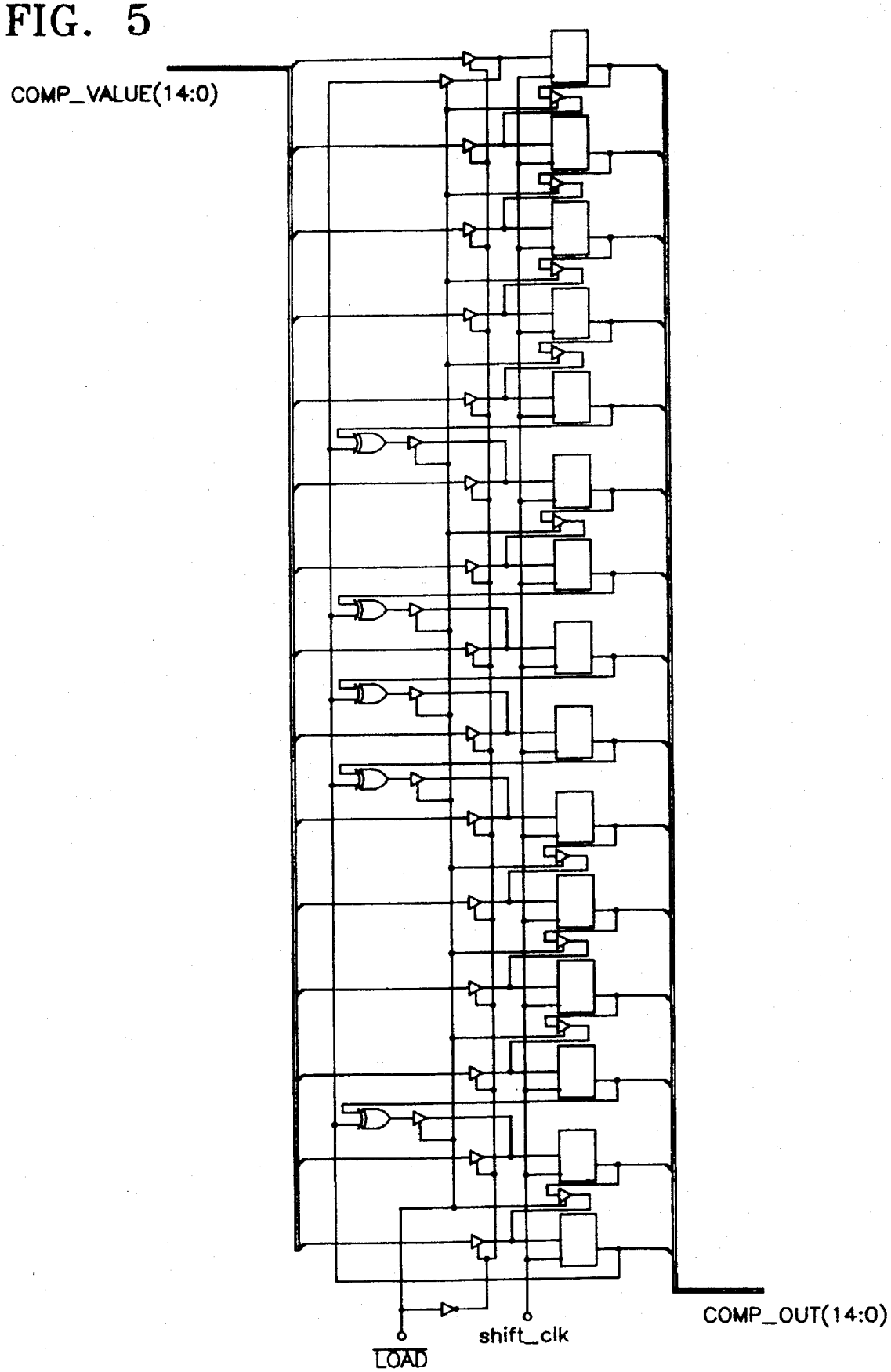
FIG. 5 is an exemplary circuital illustration showing the constitution of the comparison value translator of FIG. 1 which is for generating a comparison value corresponding to the PN sequence mask value of the PN sequence mask translator of FIG. 4.
Figure 6:
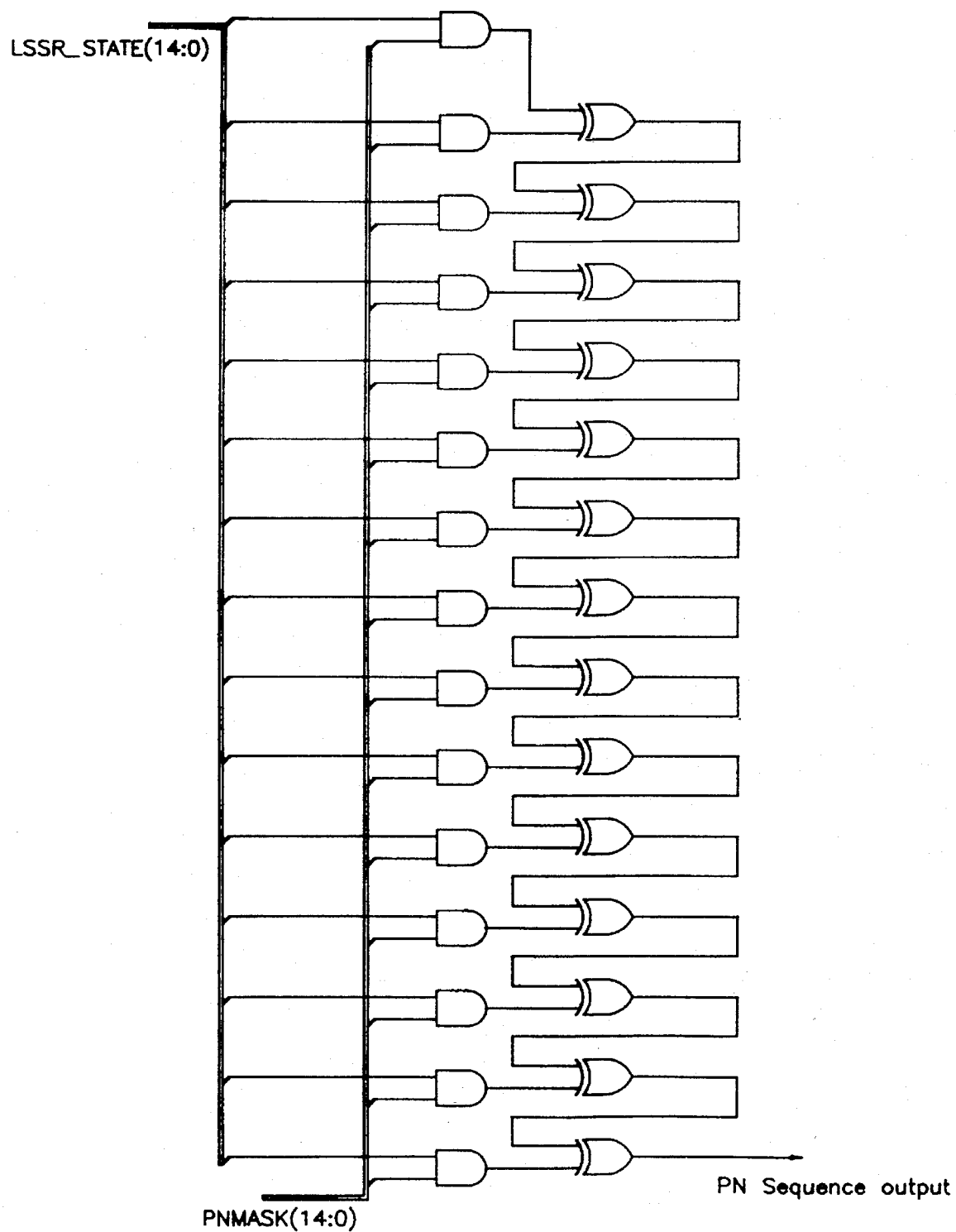
FIG. 6 is an exemplary circuital illustration showing the constitution of the mask circuit of FIG. 1 corresponding to the PN sequence mask translator of FIG. 4 and the PN sequence generator of FIG. 3.

The specific constitution of this comparison value translating circuit 500 is as shown in FIG. 5. It can be seen that its constitution is same as the PN LSSR 100 of FIG. 3.

Like the PN mask translator 400, if the PN sequence output is to be shifted by one chip, it is sufficient that the comparison value translator 500 supplies a clock signal simultaneously with the PN mask translator 400.

Meanwhile, if the offset shift value is large, a new comparison value is calculated in the same way as that of the PN mask calculating method. Then simultaneously with the loading of the mask value, the calculated comparison value is loaded, so that there can be obtained a PN sequence output having $2^N$ length in which a shifting is made as much as the offset shift value.

Figure 10:
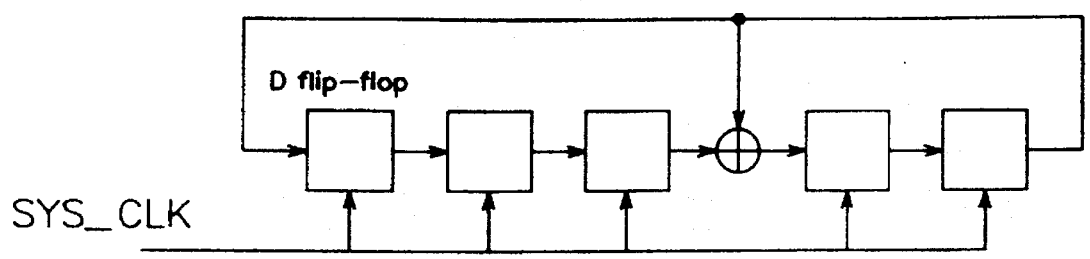
FIG. 10 is a schematic view showing the constitution of a 5-stage PN sequence generator in which the generation polynomial is $P(X)=1+X^3+X^5$.

In order to facilitate the understanding on the present invention, the constitution of the PN sequence generator of FIG. 1 will be described in which a PN sequence is generated having $2^5$ length, i.e., the maximum length linear sequence from a 5-stage PN sequence LSSR 100 in which the generating polynomial is $P(X)=1+X^3+X^5$ as shown An FIG. 10.

If the initial value which is loaded into the PN mask translator 400 is set to '00001', then the PN sequence output corresponds to the LSSR primary output.

Under this condition, if the comparison value is set to '00100', then one '0' can be inserted after the appearance of '0' four times in the PN sequence output, so that there can be obtained a PN sequence having a length of 32 (=$2^5$).

Therefore, the comparison value corresponding to the PN mask value of '00001' should be '00100'.

The comparison value has to be translated in accordance with the translation of the PN mask value as described above, and the problem is what the comparison value translating law based on the translation of the PN mask value is.

First, in order to shift the PN sequence by one chip, the mask translating matrix $M_1$ for translating the current PN mask value is as follows.

$$M_1 = \begin{vmatrix} 0 & 0 & 1 & 0 & 1 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{vmatrix} \quad (5)$$

The comparison value translating matrix $P_1$ for translating the comparison value correspondingly with the translation of the PN mask value is as follows.

$$P_1 = \begin{vmatrix} 0 & 0 & 0 & 0 & 1 \\ 1 & 0 & 0 & 0 & 0 \\ 0 & 1 & 0 & 0 & 0 \\ 0 & 0 & 1 & 0 & 1 \\ 0 & 0 & 0 & 1 & 0 \end{vmatrix} \quad (6)$$

If a PN mask value is to be generated for shifting the PN sequence output by one chip, a calculation may be carried out on $m_i = M_1 m_{i-1}$. This is equivalent to carrying out once the shifting operation as shown in FIG. 11.

Figure 14:
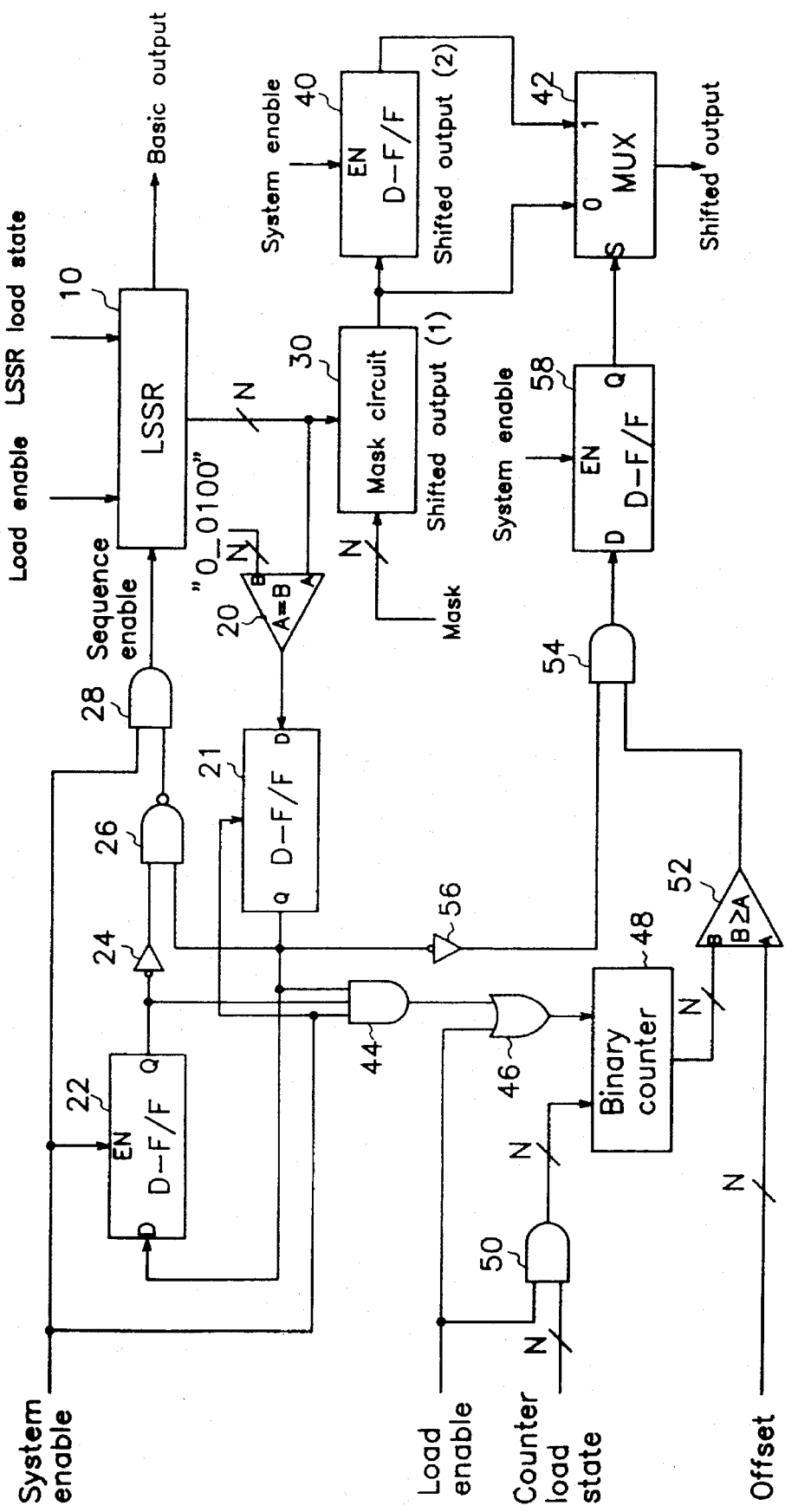
FIG. 14 illustrates schematically the constitution of the conventional PN sequence generator for generating a PN sequence having a length of $2^N$.

Under this condition, the comparison value is obtained by carrying out on $c_i = P_1 c_{i-1}$, that is, the shifting operation of FIG. 14 may be carried out simultaneously with the PN mask translation.

Figure 11:
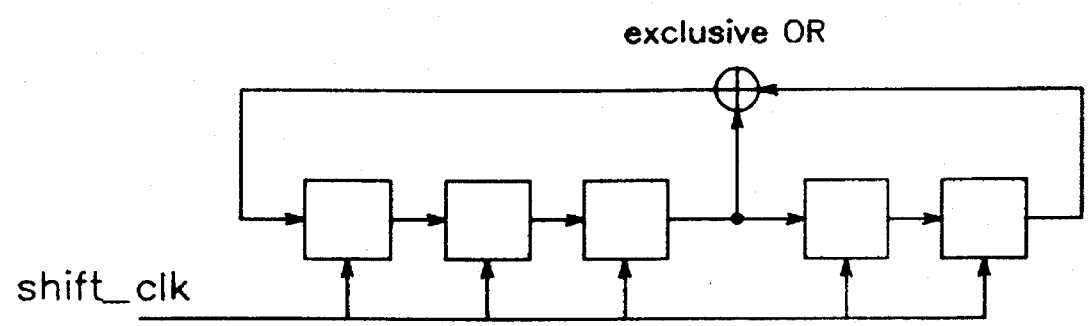
FIG. 11 illustrates a shifting operation corresponding to the PN sequence mask translating operation for shifting by one chip the output of the 5-stage PN sequence generator in which the generation polynomial is $P(X)=1+X^3+X^5$.

FIG. 11 is a timing chart for the PN sequence output, which is used when the PN mask value and the comparison value are translated.

When the PN mask value is shifted from '00001' to '10000' in accordance with the shift clock signals, the comparison value output COMP-OUT is also shifted from the initial value of '00100' to '00010'. Consequently, the PN sequence output is shifted by one chip relative to the preceding PN sequence. In the shifted PN sequence also, '0' can be successfully inserted after the appearance of the binary number '0'0 four times continuously.

A table below shows the PN mask values accompanied to the offset shifting values and the corresponding comparison values.

In the PN sequence generator according to the present invention, when the PN mask values are varied, the comparison values are also necessarily varied to values corresponding to the PN mask values.

TABLE

| | PN Mask value | Comparison value |
|---|---|---|
| 0 | '00001' (initial value) | '00100' (initial value) |
| 1 | '10000' | '00010' |
| 2 | '01000' | '00001' |
| 3 | '00100' | '10010' |
| 4 | '10010' | '01001' |
| 5 | '01001' | '10110' |
| 6 | '10100' | '01011' |
| 7 | '11010' | '10111' |
| . | . | . |
| . | . | . |
| . | . | . |
| 30 | '00010' | '01000' |

If a shifting is to be made as much as a large offset shifting value without shifting the PN sequence one chip by one chip, it is not efficient that the shifting is made by supplying the corresponding number of shift clock signals. Therefore, there should be a new method for calculating the comparison values and the PN mask values for outputting the PN sequence as much as the offset values directly from the PN mask values and the comparison values.

For this calculation, a software or a hardware may be provided, but, here, only the calculating algorithm will be described.

If the translating matrix (Formulas 5 and 6) for shifting the PN sequence by one chip is known, then based on this, translating matrices $M_2$ and $P_2$ for shifting the PN sequence by 2 chips can be established. In the same way, $M_4$ and $P_4$ can be established from $M_2$ and $P_2$, and $M_8$ and $P_8$ can be established from the $M_4$ and $P_4$.

$$M_2 = M_1 M_1 = \begin{vmatrix} 0 & 0 & 1 & 0 & 1 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{vmatrix} \begin{vmatrix} 0 & 0 & 1 & 0 & 1 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{vmatrix} = \begin{vmatrix} 0 & 1 & 0 & 1 & 0 \\ 0 & 0 & 1 & 0 & 1 \\ 1 & 0 & 0 & 0 & 0 \\ 0 & 1 & 0 & 0 & 0 \\ 0 & 0 & 1 & 0 & 0 \end{vmatrix} \quad (7)$$

$$P_2 = P_1 P_1 = \begin{vmatrix} 0 & 0 & 0 & 0 & 1 \\ 1 & 0 & 0 & 0 & 0 \\ 0 & 1 & 0 & 0 & 0 \\ 0 & 0 & 1 & 0 & 1 \\ 0 & 0 & 0 & 1 & 0 \end{vmatrix} \begin{vmatrix} 0 & 0 & 0 & 0 & 1 \\ 1 & 0 & 0 & 0 & 0 \\ 0 & 1 & 0 & 0 & 0 \\ 0 & 0 & 1 & 0 & 1 \\ 0 & 0 & 0 & 1 & 0 \end{vmatrix} = \begin{vmatrix} 0 & 0 & 0 & 1 & 0 \\ 0 & 0 & 0 & 0 & 1 \\ 1 & 0 & 0 & 0 & 0 \\ 0 & 1 & 0 & 1 & 0 \\ 0 & 0 & 1 & 0 & 1 \end{vmatrix} \quad (8)$$

Therefore, if only the initial values (current values) of the comparison value and the PN mask value are given, then new PN mask values and new comparison values can be obtained from the already known translation matrices so as to shift the PN sequence output as much as the offset shift value.

That is, for example, it is tried that the current PN sequence, which is generated from the PN sequence generator and in which the formation polynomial is $P(X)=1+X^3+X^5$, is to be shifted by 9 chips. Then the PN mask vector value can be obtained from the following formula.

$$\begin{vmatrix} m0 \\ m1 \\ m2 \\ m3 \\ m4 \end{vmatrix} = M_8 M_1 \begin{vmatrix} m0 \\ m1 \\ m2 \\ m3 \\ m4 \end{vmatrix} \quad (9)$$

Meanwhile, the calculation of the comparison value corresponding to this can be carried out based on the following formula.

$$\begin{vmatrix} c0 \\ c1 \\ c2 \\ c3 \\ c4 \end{vmatrix} = P_8 P_1 \begin{vmatrix} c0 \\ c1 \\ c2 \\ c3 \\ c4 \end{vmatrix} \quad (10)$$

Looking into the translation matrices of Formulas 5 to 8, there are certain relationships between the matrix vectors within the same matrix. Therefore, when the matrix is expressed as follows, $$M = \begin{vmatrix} M0 \\ M1 \\ M2 \\ M3 \\ M4 \end{vmatrix} \quad (11)$$

if the first vector M0 is known, then M1, M2, M3 and M4 can be deduced based on a certain formula. Therefore, in calculating the matrix, the first vector has only to be known.

This principle is applied also to the calculation of the comparison value.

Figure 12:
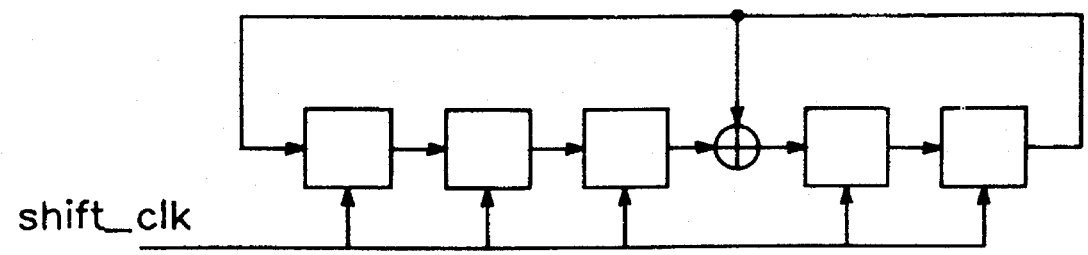
FIG. 12 illustrates a shifting operation corresponding to the comparison value translating operation for generating a comparison value corresponding to the PN sequence mask translating operation of FIG. 11.
Figure 13:
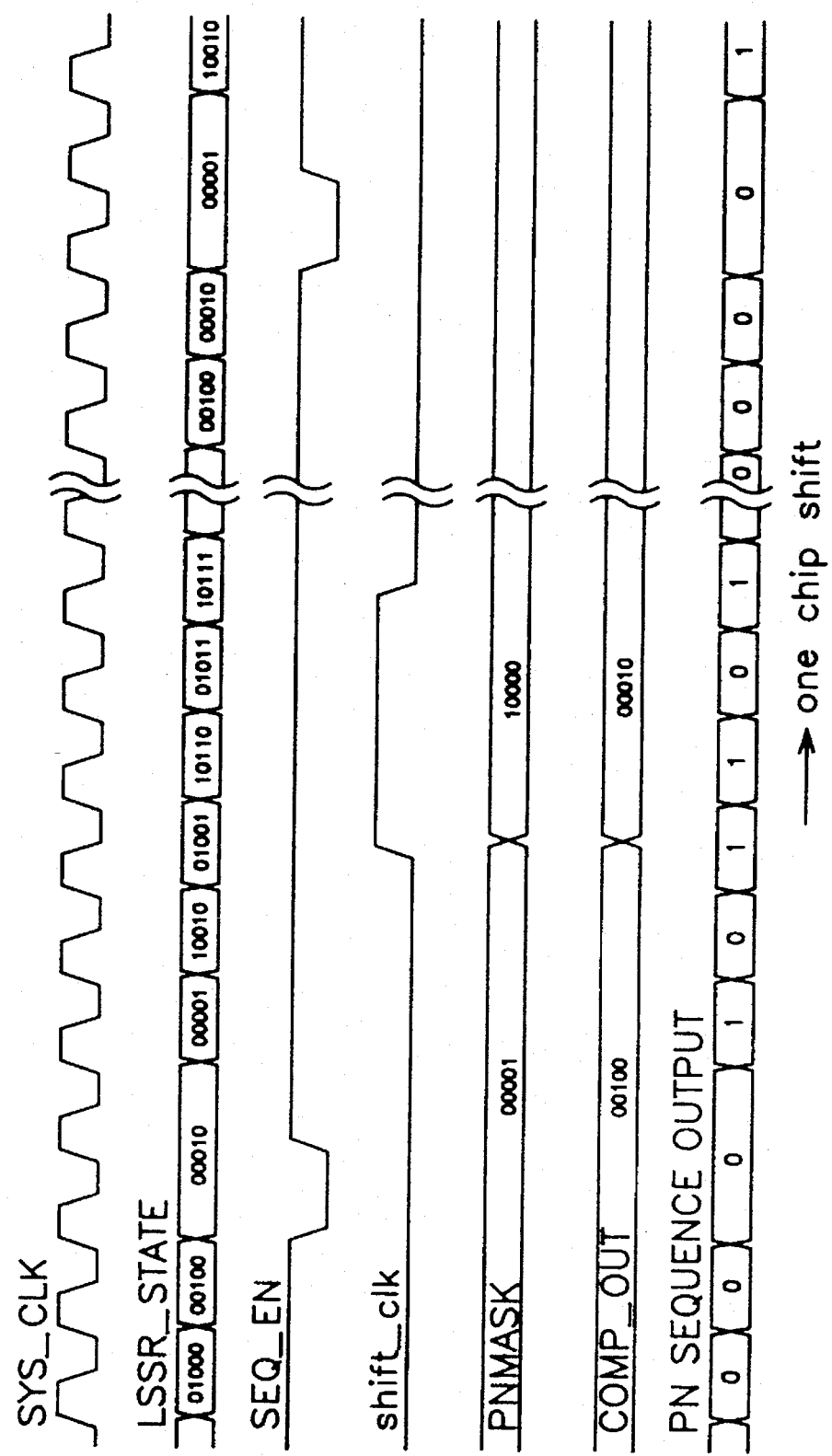
FIG. 13 illustrates the timing of the PN sequence output during the translation of the PN sequence mask value and the comparison value according to the present invention.

In M of the PN mask translating matrix, if the vector is shifted as shown in FIG. 12, then the next vector value can be obtained.

In the case of the comparison value translating matrix, if the vector value is shifted as shown in FIG. 11, then the next vector value can be obtained. In the case of 4 rows (i=3), the third (i=2) row vector is shifted, and then, the first row vector (i=0) is subjected to a bitwise exclusive OR, thereby obtaining the intended value.

The case where a 15-stage PN sequence generator has a formation polynomial of $P(X)=1+X^5+X^7+X^8+X^9+X^{13}+X^{15}$ will be described. That is, when the vector values for the 6th row (i=5), the 8th row (i=7), the 9th row (i=8), the 10th row (i=9) and the 14th row (i=13) are to be obtained, the preceding vector is shifted as shown in FIG. 8, and then, the first row vector (i=0) is subjected a bitwise exclusive OR, thereby obtaining the intended value.

Owing to such relationships between the row vectors within the translating matrix, the vector calculations are carried out N times instead of row and column calculations N×N times.

Figure 7:
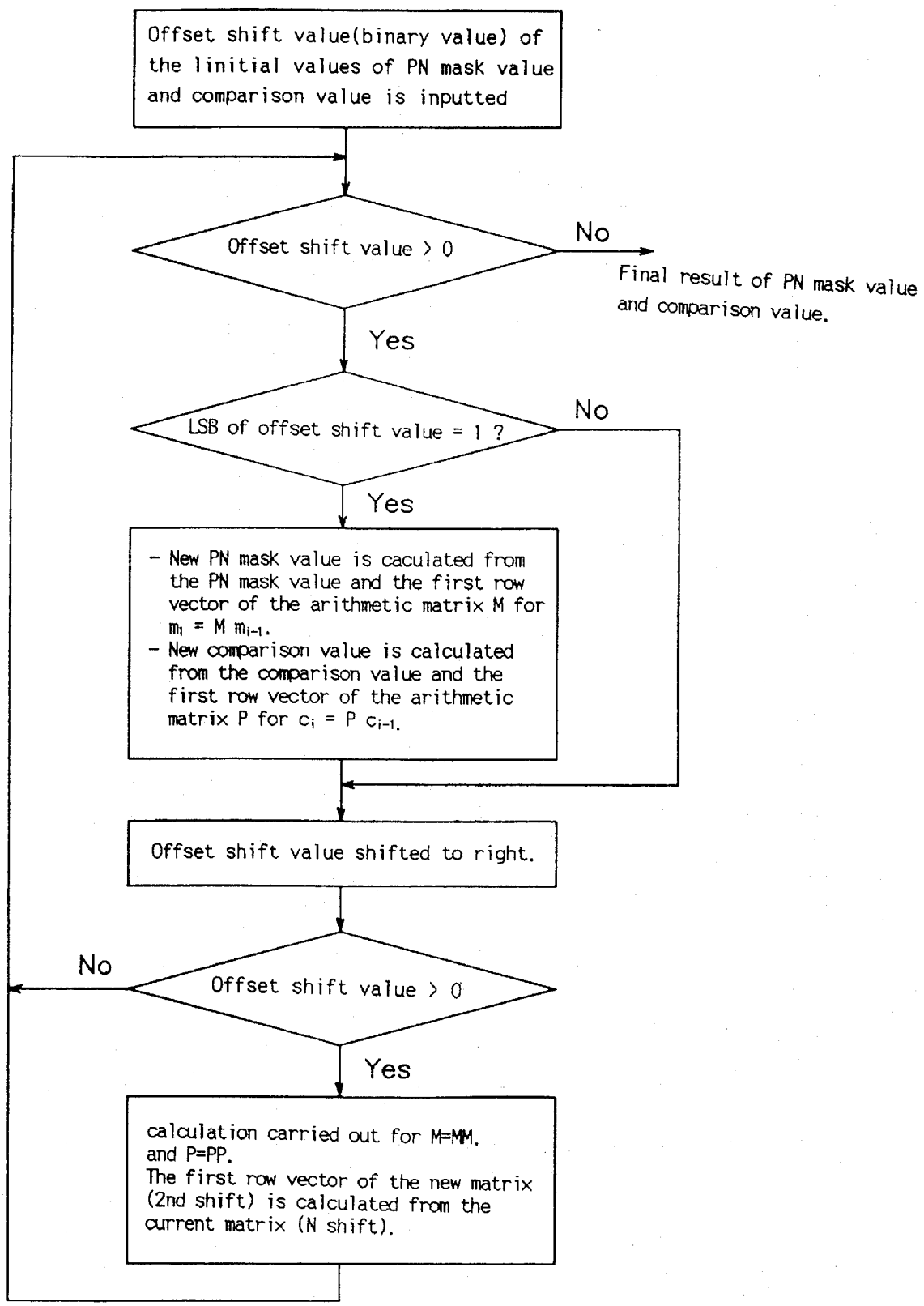
FIG. 7 is a flow chart showing the method for calculating a PN sequence mask value and a comparison value corresponding to the former.

The flow chart of FIG. 7 illustrates the general method of calculating the new PN sequence value and the comparison value for shifting the PN sequence output from the initial values of the PN mask and comparison value as much as the offset shift value.

Referring to FIG. 7, the calculation process based on Formulas 9 and 10 for shifting the PN sequence output by 9 chips (offset shift value=9) will be described as follows.

1) The current PN mask value ($m_o$) and the comparison value ($c_o$) are inputted. Offset shift value='1001' (binary).

2) $m_1=M_1 m_o$ and $c_1=P_1 C_o$ are calculated, because the LSB (least significant bit) value of the offset is 1.
(The PN mask value and the comparison value are calculated for shifting the PN sequence by one chip).

3) The offset value is shifted to the right.
Offset value='100' (>0).

4) $M_2=M_1 M_1$ and $P_2=P_1 P_1$ are calculated.
The translating matrices for the PN and comparison values corresponding to offset value=2 are calculated.
(The first row vector value for $M_2$ and $P_2$ rows and columns is calculated.)

5) LSB=0 for the offset value.

6) The offset value is shifted to right
Offset value='1–' (>0).

7) $M_4=M_2 M_2$, and $P_4=P_2 P_2$ are calculated.
The PN translating matrix and the comparison value translating matrix corresponding to the offset value=4 are calculated.
(The first vector value for $M_4$ and $P_4$ matrices is calculated.)

8) LSB=0 for the offset value.

9) The offset value is shifted to the right.
Offset value='1' (>0).

10) $M_8=M_4 M_4$, and $P_8=P_4 P_4$ are calculated.
The PN translating matrix and the comparison value translating matrix corresponding to the offset value=8 are calculated.
(The first vector value for the $M_8$ and $P_8$ matrices is calculated.)

11) The LSB value for the offset value is 1.
Therefore, $m_2=M_8 m_1$, and $c_2=P_8 c_1$ are calculated.
(The PN mask value and the comparison value are calculated for shifting the already one chip shifted PN sequence by 8 chips.)

12) The offset is shifted to the right.
The Offset value='0'.

13) As the offset value='0', the final output values of the PN mask value and the comparison value are obtained.

14) The final output values are inputted into the mask translator 400 and into the comparison value translator 500.

According to the PN sequence generator of the present invention as described above, clock signals have only to be supplied to the PN mask translator 400 and to the comparison value translator 500, so that the shifted PN sequence output can be obtained. Further, in order to shift the PN sequence output as much as an arbitrary offset shift value, there is provided a method which makes it possible to calculate new PN mask values and new comparison values based on the current PN mask value and the current comparison value. This method can be usefully applied to the initial pilot acquisition process in the CDMA spread band mobile communication system. That is, this method can be effectively applied to when the PN sequence of a mobile station is to be shifted for synchronizing the pilot offset value with signals from a base station during a pilot search step to shift or handoff the PN sequences in a sequential manner.

Unlike the conventional technique in which only a fixed comparison value is used, the present invention adopts a method of forming a new comparison value corresponding to the PN mask value by using a comparison value translator, this being the greatest advantage of the present invention. As a result, the conventional additional circuits for inserting an additional bit into the PN sequence output are not required, and therefore, the constitution of the present invention is very much simplified compared with the conventional apparatus.

Further, if only the current PN mask value is known, then a new mask value can be directly formed from the offset shift value by which the PN sequence is to be shifted. Further, a new comparison value corresponding to the new mask value is formed, so that the desired timing PN sequence can be obtained without taking into account the LSSR state, this being a new method.

When the PN sequence is to be shifted in the present invention, a new mask value for shifting the PN sequence can be formed in a fast manner based on the simple hardware or software which is provided by the present invention. Consequently the PN mask lookup table which occupies a large area of the memory is not required, and therefore, the system operation becomes more efficient.

What is claimed is:

1. A power of two length PN sequence generator comprising:

a linear sequence shifter register (LSSR) that is operated in synchronization with signals from a system clock, that receives an initial LSSR state input in accordance with a load enable signal, and that carries out a shift operation in accordance with a sequence enable signal, so as to generate and output a PN sequence;

a comparator having input terminals for receiving said output PN sequence of said LSSR into an input terminal and for receiving a comparison value signal into another input terminal, said comparator comparing the two inputs and providing a resultant output based on the comparison;

a mask circuit for receiving said output PN sequence from said LSSR and PN mask data to carry out a masking operation and to output the resulting shifted PN sequence; and a bit adding means operated in response to said system clock signals and to a system enable signal for delaying said PN sequence by one cycle when said comparator finds an identical match between said PN sequence and said comparison value signal, and so as to add one bit into a proper position in the PN sequence;

said bit adding means comprising:

a flip flop means for receiving the output of said comparator in synchronization with said system clock signals for providing a resulting logic signal output; and gate means having input terminals and receiving the output of said flip flop means into one of its input terminals, and receiving said system enable signals into another input terminal, said gate means for carrying out a logic arithmetic operation and for providing sequence enable signals to said LSSR; and said PN sequence generator further comprising:

a PN mask translating means operated in synchronization with shift clock signals for receiving an initial PN mask value in accordance with load signals and for translating them into PN mask data before outputting them;

a comparison value translating means operated in synchronization with the shift clock signals for receiving an initial comparison value of N bits in accordance with the load signals for translating them into a value corresponding to the PN mask data to supply them to said comparator; and relevant N×N translating matrices;

whereby said PN mask translating means and said comparison value translating means calculate said PN mask data and said shifted comparison value by utilizing the relevant N×N translating matrices.

* * * * *